United States Patent
Adams

(10) Patent No.: US 11,255,500 B1
(45) Date of Patent: Feb. 22, 2022

(54) MULTI-FUNCTIONAL STREETLIGHT

(71) Applicant: Heidi Adams, Los Angeles, CA (US)

(72) Inventor: Heidi Adams, Los Angeles, CA (US)

( * ) Notice: Subject to any disclaimer, the term of this patent is extended or adjusted under 35 U.S.C. 154(b) by 0 days.

(21) Appl. No.: 17/183,999

(22) Filed: Feb. 24, 2021

(51) Int. Cl.
| | | |
|---|---|---|
| *F21S 8/08* | (2006.01) | |
| *F21S 9/03* | (2006.01) | |
| *G09F 9/30* | (2006.01) | |
| *G09F 7/00* | (2006.01) | |
| *G09F 23/00* | (2006.01) | |
| *B60L 53/31* | (2019.01) | |
| *B60L 53/51* | (2019.01) | |
| *H02S 20/10* | (2014.01) | |
| *H02J 7/00* | (2006.01) | |
| *H02J 7/35* | (2006.01) | |
| *F21V 19/04* | (2006.01) | |
| *E04H 12/22* | (2006.01) | |
| *F21W 131/103* | (2006.01) | |
| *F21Y 115/10* | (2016.01) | |
| *E04H 12/08* | (2006.01) | |

(52) U.S. Cl.
CPC ............. *F21S 8/085* (2013.01); *B60L 53/31* (2019.02); *B60L 53/51* (2019.02); *F21S 9/035* (2013.01); *F21V 19/04* (2013.01); *G09F 7/00* (2013.01); *G09F 9/30* (2013.01); *G09F 23/00* (2013.01); *H02J 7/0042* (2013.01); *H02J 7/35* (2013.01); *H02S 20/10* (2014.12); *E04H 12/08* (2013.01); *E04H 12/2261* (2013.01); *F21W 2131/103* (2013.01); *F21Y 2115/10* (2016.08)

(58) Field of Classification Search
CPC ............. F21S 8/085; F21S 8/086; F21S 8/08
See application file for complete search history.

(56) References Cited

U.S. PATENT DOCUMENTS

| | | | | |
|---|---|---|---|---|
| 4,200,904 | A * | 4/1980 | Doan .................. | F21S 9/043 362/183 |
| 6,060,658 | A * | 5/2000 | Yoshida ................ | G09F 13/02 136/243 |
| 10,947,751 | B2 * | 3/2021 | Lockwood ............. | F21S 8/086 |
| 10,948,143 | B2 * | 3/2021 | Lockwood ............. | F21S 9/02 |
| 2007/0052385 | A1 * | 3/2007 | Fan ....................... | F21S 8/086 320/101 |
| 2010/0008078 | A1 * | 1/2010 | Zhang ................... | F21S 8/085 362/183 |
| 2010/0328951 | A1 * | 12/2010 | Boissevain ........... | F21S 8/088 362/249.02 |
| 2015/0145698 | A1 * | 5/2015 | Werner ................. | G08G 1/0112 340/928 |

(Continued)

FOREIGN PATENT DOCUMENTS

| | | | | |
|---|---|---|---|---|
| CN | 204730143 | U * | 10/2015 | |
| FR | 3095352 | A1 * | 10/2020 | ........... F21S 8/088 |

(Continued)

*Primary Examiner* — Alexander K Garlen

(74) *Attorney, Agent, or Firm* — Alonzo & Associates; Arlyn Alonzo

(57) ABSTRACT

Aspects of the disclosure are directed to a multi-functional streetlight. In accordance with one aspect, the multi-functional streetlight includes a hexagonal shaped support structure, wherein the hexagonal shaped support structure includes an arm segment and wherein the arm segment includes a luminaire on an under side of the arm segment; and a base flange configured to couple the hexagonal shaped support structure to the ground.

18 Claims, 16 Drawing Sheets

(56) References Cited

U.S. PATENT DOCUMENTS

| | | | | |
|---|---|---|---|---|
| 2017/0122546 A1* | 5/2017 | Abbott | .................... | F21V 33/00 |
| 2018/0146531 A1* | 5/2018 | Rinko | ..................... | F21S 8/085 |
| 2019/0225091 A1* | 7/2019 | Wheatley | ................ | H02J 3/383 |
| 2020/0116318 A1* | 4/2020 | Bembridge | ........... | E04H 12/003 |
| 2020/0355328 A1* | 11/2020 | Bukkems | .............. | F21V 19/001 |
| 2021/0131629 A1* | 5/2021 | Bembridge | ............. | E04H 12/00 |
| 2021/0188637 A1* | 6/2021 | Khabashesku | ...... | C01B 21/0648 |

FOREIGN PATENT DOCUMENTS

| | | | | |
|---|---|---|---|---|
| WO | WO-2005078336 A1 * | 8/2005 | ............. | F21S 9/022 |
| WO | WO-2014048575 A2 * | 4/2014 | ............ | F24S 30/425 |

* cited by examiner

View C-C

Section B-B

Section A-A

1000

1012
1010
1011

43°
1021
1020

1031
1030

1100

120

47°
1121

1130

Outside Corner — Inside Corner

1200

1210

1220
Section A-A

1230
A
A

1300

1310

1320

View A-A

1330

A-A

1400

1410

1420

View A-A

1430

A
A
25°

MULTI-FUNCTIONAL STREETLIGHT

TECHNICAL FIELD

This disclosure relates generally to the field of streetlights, and, in particular, to a multi-functional streetlight.

BACKGROUND

Streetlights are ubiquitous throughout the world as light sources along roadways of all types. One common variety of streetlight uses light emitting diodes (LEDs) as a light source. For proper geometric illumination over a desired area, the streetlight needs a support structure, e.g., a pole, of a certain height above the ground surface. A typical streetlight employs a circular shaped pole to support the light source.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides a multi-functional streetlight. Accordingly, a multi-functional streetlight, including a hexagonal shaped support structure, wherein the hexagonal shaped support structure includes an arm segment and wherein the arm segment includes a luminaire on an under side of the arm segment; and a base flange configured to couple the hexagonal shaped support structure to the ground. In one example, the hexagonal shaped support structure further includes a lower segment and an intermediate segment, wherein the lower segment is coupled to the intermediate segment and the intermediate segment is coupled to the arm segment.

In one example, a planar cut out of each of the lower segment, the intermediate segment and the arm segment is hexagonal in shape. In one example, the multi-functional streetlight further includes a digital banner configured to present one or more of the following: advertisement, traffic information, street signage information, consumer information, news information, and weather information, wherein the digital banner is attached to the hexagonal shaped support structure.

In one example, the digital banner is attached to the intermediate segment. In one example, the digital banner includes a banner rod, and wherein the banner rod comprises a structural rod and one or more of the following: an auxiliary light source, a camera and one or more sensors configured for environmental sensing. In one example, the auxiliary light source comprises one or more light emitting diodes (LEDs).

In one example, the multi-functional streetlight further includes a non-digital banner configured to present one or more of the following: advertisement, traffic information, street signage information, consumer information, news information, and weather information, wherein the non-digital banner is attached to the hexagonal shaped support structure. In one example, the non-digital banner is attached to the lower segment.

In one example, the multi-functional streetlight further includes a pedestrian arm, wherein the pedestrian arm is configured to provide shading from the sun to a pedestrian near the multi-function streetlight. In one example, the pedestrian arm includes a plurality of light sources. In one example, the luminaire includes a plurality of illumination modules, and wherein each of the plurality of illumination modules is configured for replacement without affecting illumination output of a remaining of the plurality of illumination modules.

In one example, the multi-functional streetlight further includes an electric vehicle (EV) charging station, wherein the EV charging station is located on the lower segment. In one example, the multi-functional streetlight further includes a portable device charging station, wherein the portable device charging station is located on the lower segment. In one example, the multi-functional streetlight further includes at least one solar cell coupled to the multi-functional streetlight, wherein the at least one solar cell is configured for electric energy generation.

In one example, the at least one solar cell is configured to power one or both of the EV charging station and the portable device charging station. In one example, the multi-functional streetlight further includes one or more of a wireless communications node, an emergency call station, a digital interactive street portal, an alert notification. In one example, the lower segment comprises a digital display configured to present one or more of the following: advertisement, traffic information, street signage information, consumer information, news information, and weather information.

In one example, the lower segment includes a trapezoidal shaped panel configured to house the digital display. In one example, the multi-functional streetlight further includes a plurality of solar cells on a top side of the arm segment, wherein the plurality of solar cells is configured to deliver electric energy to the luminaire.

These and other aspects of the present disclosure will become more fully understood upon a review of the detailed description, which follows. Other aspects, features, and implementations of the present disclosure will become apparent to those of ordinary skill in the art, upon reviewing the following description of specific, exemplary implementations of the present invention in conjunction with the accompanying figures. While features of the present invention may be discussed relative to certain implementations and figures below, all implementations of the present invention can include one or more of the advantageous features discussed herein. In other words, while one or more implementations may be discussed as having certain advantageous features, one or more of such features may also be used in accordance with the various implementations of the invention discussed herein. In similar fashion, while exemplary implementations may be discussed below as device, system, or method implementations it should be understood that such exemplary implementations can be implemented in various devices, systems, and methods.

DETAILED DESCRIPTION

Figure 1:
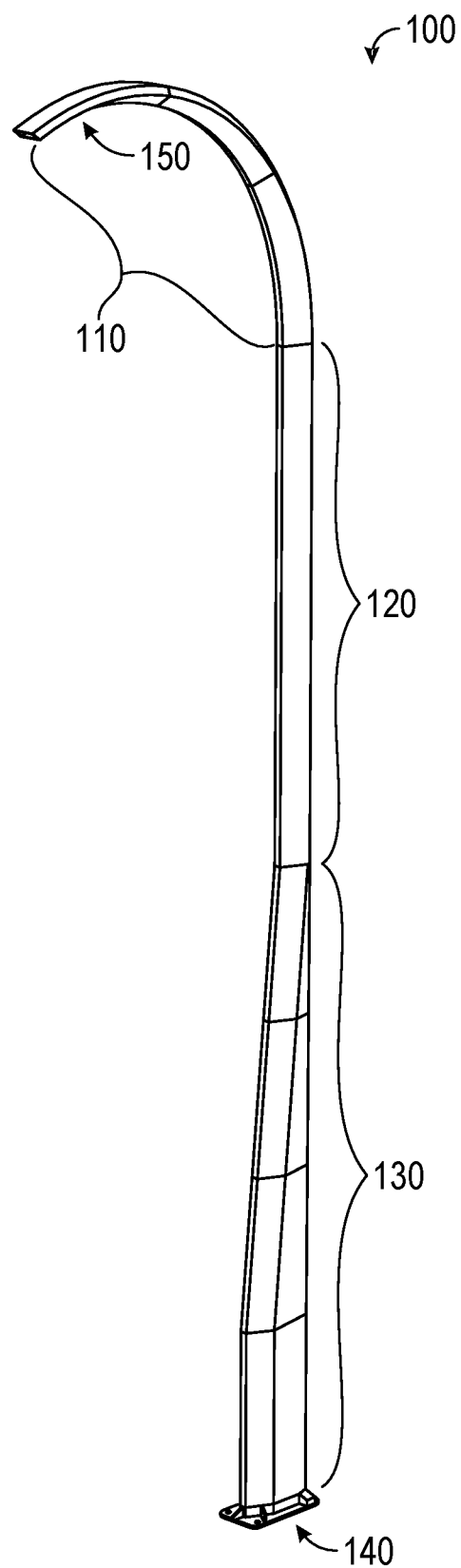
FIG. 1 illustrates an example multi-functional streetlight.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

In one aspect, various kinds of support structures may be considered, with different design features and capabilities, as a platform for multiple functions beyond pure illumination. Streetlights may use different types of light sources. One common type of light source is a light emitting diode (LED). LEDs have the advantage of higher energy efficiency (i.e., conversion of electric energy to illumination energy) and longer life compared to other light sources such as incandescent lights, arc lamps, halogen lamps, sodium vapor lamps, etc. Light sources may have several requirements such as luminous intensity (i.e., wavelength-weighted power per solid angle), measured in candelas (cd); luminance (i.e., luminous intensity per area), measured in candelas/square meter (cd/m$^2$); and luminous flux (i.e., total perceived power over all directions), measured in lumens (lm). For example, one lumen of visible light with a wavelength of 555 nm may be produced by a light source with $\frac{1}{683}$ W of radiant power. Other requirements for light sources may be luminous efficacy (measured in lumens per watt), power factor, color temperature (measured in Kelvin), lifetime, etc.

In one example, the streetlight includes a luminaire and a support structure. For example, the luminaire is an assembly at a raised height which includes the light source (e.g., LEDs) and a mechanical structure to attach the light source to the support structure. In one example, different types of luminaires may be used in the streetlight, such as flat, mast, cobra head, etc. For example, LEDs may be assembled into an LED module with a plurality of LEDs integrated together for ease in installation and servicing.

In one example, the support structure (for example, a light pole) provides the mechanical and electrical support for the luminaire. For example, the support structure may have several requirements such as height, structural strength, mechanical stability, aesthetic appearance, etc. For example, the support structure may have a height of approximately 5 to 15 meters (approximately 16 to 50 feet) above the ground.

In one example, a metal, for example, aluminum, may be shaped into a desired form by a metal shaping technique. Metal shaping techniques include casting, extrusion, etc. For example, casting uses a mold (e.g., a preformed cast) with molten metal to create a cast metal into the desired form. For example, extrusion forces metal through an aperture into a closed area to create an extruded metal into the desired form.

For example, a streetlight may also be used as a platform for multiple functions beyond illumination. An example list of functions which may be included in the streetlight include:

Pedestrian shading
Solar cells for electric energy generation
Portable device charging (e.g., USB charging station)
Electric vehicle (EV) charging for parked EVs
Wireless communications node (e.g., WiFi network hub)
Placard display/banner display with LED lighting
Electronic advertising
Street signage
Pedestrian lighting
Camera imaging/imaging sensor
Environmental sensing
Full spectrum color control
Emergency call station (e.g., 911 call portal, AAA vehicle dispatch connection, etc.)
Digital interactive street portal (e.g., Internet access such as for emails, streaming, social media access, etc.)
Audio sensing
Alert notification (e.g., news notification, police alert, 911 calling portal, etc.)
Emergency accent light One skilled in the art would understand that the example list of functions is not an exclusive list and that other functions not listed herein are within the scope and spirit of the present disclosure. Additionally, depending on particular applications, an example multi-functional streetlight of the present disclosure need not include all of the functions listed herein and is still within the scope and spirit of the present disclosure.

In one aspect, the multi-functional streetlight is a multi-functional modular streetlight. For example, one or more illumination functions may be provided via one or more illumination modules. And, this one or more illumination modules is incorporated into the multi-functional streetlight to make it a multi-functional modular streetlight. For example, various quantities of illumination modules may be incorporated for different illumination levels. Although the examples in the present disclosure may be directed to a multi-functional streetlight, one skilled in the art would understand that the modularity of the multi-functional streetlight is an example aspect that may be included and that the present disclosure applies equally to a multi-functional streetlight with the modularity aspect as well as without the modularity aspect.

In one aspect, in an example usage of a placard display/banner display, a top banner rod may be positioned on the top portion of the placard display/banner display. This top banner rod may be configured for stabilization. Additionally, a bottom banner rod may be position on the bottom portion of the placard display/banner display. In one example, the bottom banner includes a plurality of LEDs as a light source (e.g., an auxiliary light source) for illumination. The banner may be cloth, vinyl, canvas, digital, etc. In one example, environmental sensor(s) and/or a camera may be attached to either or both of the banner rods (i.e., the top banner rod and/or the bottom banner rod).

In one aspect, in an example usage of full spectrum color control, color mixing using red/green/blue/white (RGBW) LEDs may be utilized in the multi-functional streetlight.

In one aspect, in an example usage of a digital interactive street portal, an interactive display screen may be utilized to display various information, including, but not limited to, transit schedules, tourist information, art exhibits, commercial advertisements, etc. In addition, a non-interactive display screen may also be used for various other functions, such as, but not limited to, transit schedules, tourist information, art exhibits, commercial advertisements, etc. In one example, the information being displayed on the interactive display screen differs from the information being displayed on the non-interactive display screen. In one example, the interactive display screen is an interactive flat display screen. In one example, the non-interactive display screen is a non-interactive flat display screen.

In one aspect, solar cells coupled to the multi-functional streetlight may generate electric energy for internal usage by the multi-functional streetlight. For example, the luminaire (s) and/or other light sources on the multi-functional streetlight may receive their electric energy from solar cells coupled to the multi-functional streetlight. In one example, the multi-functional streetlight may use solar cells as its primary energy source to power its various features (e.g., portable device charging or USB charging station, electric vehicle (EV) charging station, wireless communications node, digital banner, digital display, electronic advertising, pedestrian lighting, camera, sensor(s), emergency call station, digital interactive street portal, alert notification, etc.) In one example, additional electric energy needed by the multi-functional streetlight (beyond what the solar cells can supply) may be supplied by a utility grid. In one example, the energy from the solar cells may be returned to the power grid. In one example, the energy being routed to the power grid is excess energy not needed by the multi-functional streetlight.

In one example, a multi-functional streetlight may be provided electric energy at various voltages (e.g., 120 v, 230 v, 347 v, 480 v, etc.) and at various AC frequencies (e.g., 50 Hz, 60 Hz, etc.). For example, the streetlight may be compliant with lighting standards such as ANSI/IES RP8 and may have full photometric compliance. In one example, photometric compliance may include compliance with several photometric requirements such as luminous flux, luminous efficacy, color rendering, color temperature, spectral distribution, luminance, luminous intensity, etc.

In one example, a multi-functional streetlight may include a luminaire which is a source of light and which, for example, comprises a plurality of LEDs. For example, the luminaire may include a flexible quantity of LEDs, depending on illumination requirements. For example, the luminaire may include a silicone lens (e.g., micro-prismatic) or a cobra head lens to cover the light source (e.g., plurality of LEDs). In one example, the luminaire may be modular with up to 16 modules with approximately 5000 lumens of luminous flux per module. In one example, e ach module may be replaced without affecting the other remaining modules.

In one example, the multi-functional streetlight may include a programmable driver or a programmable processor with a memory for light source control. For example, the programmable driver may be a combination of hardware and software used to control one or more of a plurality of LEDs for color control, illumination control, signaling, camera control, electronic advertising control, dimming control, wireless network, etc.

FIG. 1 illustrates an example multi-functional streetlight 100. In one example, the multi-functional streetlight includes a support structure which extends to near the ground. In one example, the multi-functional streetlight 100 includes modular features and may be referred to as a multi-functional modular streetlight. As disclosed in the present disclosure, the term multi-functional streetlight may or may not include modular features, and thus, the term multi-functional streetlight as used in the present disclosure does not exclude including one or more modular features.

In one example, the multi-functional streetlight 100 includes the following components: an arm segment 110, an intermediate segment 120, a lower segment 130 and a base flange 140. In one example, the arm segment 110, the intermediate segment 120, and the lower segment 130 form the support structure of the multi-functional streetlight 100. In one example, a luminaire 150 is included in the arm segment 110. For example, the luminaire 150 may be a portion of the underside of the arm segment 110. Being on the underside of the arm segment 110, the luminaire 150 allows light source(s) to illuminate the ground. In another example, the luminaire 150 is an external attachment to the arm segment 110. In one example, the luminaire 150 is modular and includes a plurality of illumination modules. Each illumination module contributes a portion of the total illumination intensity of the luminaire. Each illumination module may be replaced without affecting the other remaining illumination modules.

In one example, the base flange 140 may be subterranean (i.e., below the ground surface). In another example, the base flange 140 may be surface-mounted (i.e., on the ground surface). In one example, the arm segment 110, the lower segment 130 and/or the base flange 140 may be constructed using a cast metal, for example, cast aluminum (e.g., 356-T4). In one example, the intermediate segment 120 may be constructed using an extruded metal, for example, extruded aluminum (e.g., 6061-T4). In one example, cast metal may be formed using molten metal using a preformed cast. In one example, extruded metal may be formed using aperture shaping of a forced metal. In one example, the multi-functional streetlight may have an overall height of approximately 30 feet (approximately 9 meters). In one example, the lower segment 130 may include at least one side with a trapezoidal shape. For example, the trapezoidal shape has four sides with two sides parallel and two sides non-parallel. In one example, a support structure 160 includes the arm segment 110, the intermediate segment 120 and the lower segment 130. In one example, the support structure 160 may be constructed using a cast metal (e.g., cast aluminum) except the intermediate segment 120 may be extruded.

Figure 2:
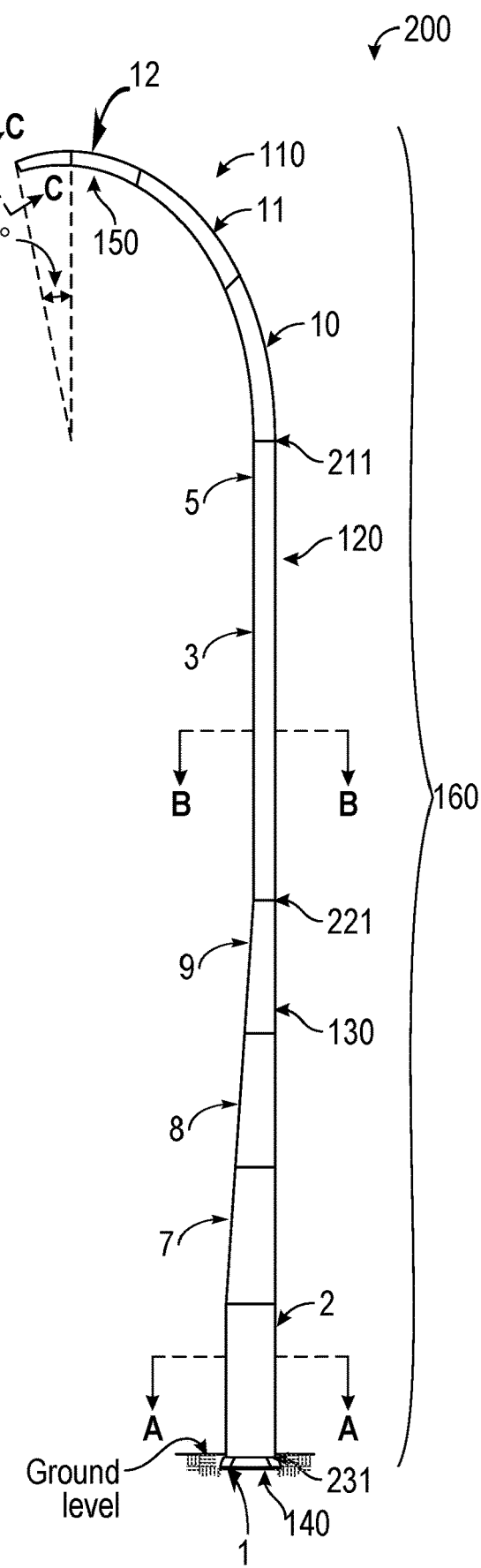
FIG. 2 illustrates a side view of the example multi-functional streetlight of FIG. 1.

FIG. 2 illustrates a side view 200 of the example multi-functional streetlight 100 of FIG. 1. For example, the arm segment 110 extends downwards to a first cross-section 211. For example, the intermediate segment 120 extends vertically downwards from the first cross-section 211 to a second cross-section 221. For example, the lower segment 130 extends vertically downward from the second cross-section 221 to a third cross-section 231. In FIG. 2, the bottom of the lower segment 130 is at ground level. In one example, the lower segment 130 is supported by the base flange 140. In one example, the base flange 140 is subterranean. In another example, the lower segment 130 is supported by the base flange 140 which is placed above the ground level. In one example, the lower segment 130 may include at least one side with a trapezoidal shape.

In one aspect, any dimensions listed in the drawings and in the present disclosure are in inches, unless otherwise specified. And, any dimensions listed are example dimensions. The listed dimensions are examples only and one skilled in the art would understand that other dimensions are within the scope and spirit of the present disclosure. Shown in FIG. 2 are numbers 1 through 12 with the following designations: 1 indicates a base flange; 2 indicates a pole base casting; 3 indicates a square tube (which in one example has the following dimensions: 4"×4"×0.25 wall× 283" long); 5 indicates a middle extrusion (a.k.a. an intermediate segment 120); 7 indicates a bottom transition section (a.k.a., bottom portion of the lower segment 130); 8 indicates a middle transition section (a.k.a., middle portion of the lower segment 130); 9 indicates a top transition section (a.k.a., top portion of the lower segment 130); 10 indicates a davit arm (a.k.a., arm segment 110), bottom section; 11 indicates a davit arm (a.k.a., arm segment 110), middle section and 12 indicates a davit arm (a.k.a., arm segment 110), top section. Also shown in FIG. 2, are three indications of sectional cutouts as indicated by A-A, B-B and C-C.

Figure 3:
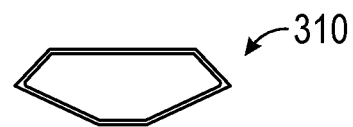
FIG. 3 illustrates three cross-sectional views of the multi-functional streetlight of FIG. 1.
Figure 3:
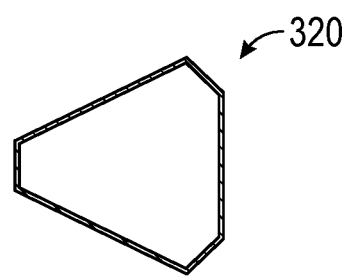
Figure 3:
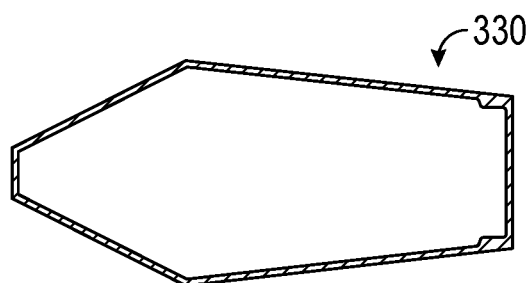

FIG. 3 illustrates three cross-sectional views of the multi-functional streetlight 100 of FIG. 1. The three cross-sectional views correspond to the three sectional cutouts indicated as A-A, B-B and C-C in FIG. 2. For example, a first cross-section 310 corresponds to a cross-sectional view of the sectional cutout indicated as C-C in FIG. 2. That is, the first cross-section 310 illustrates a cross-section of the arm segment 110.

For example, a second cross-section 320 corresponds to a cross-sectional view of the sectional cutout indicated as B-B in FIG. 2. That is, the second cross-section 320 illustrates a cross-section of the intermediate segment 120.

For example, a third cross-section 330 corresponds to a cross-sectional view of the sectional cutout indicated as A-A in FIG. 2. That is, the third cross-section 330 illustrates a cross-section of the lower segment 130.

In example, all cross-sections of the multi-functional streetlight 100 have a similar polygon shape. In one example, all cross-sections of the multi-functional streetlight 100 have a hexagonal (i.e., six-sided) shape. And, in one example, the dimensions of the sides of the hexagonal shape may differ from the examples shown in the present disclosure or the relative dimensions of the sides of hexagonal shape may differ from the examples shown in the present disclosure. One skilled in the art would understand that other dimensions and/or other relative dimensions are also within the scope and spirit of the present disclosure.

In one example, the hexagonal shape of the cross sections of the multi-functional streetlight 100 provides utility benefits for multiple functions, such as pedestrian shading, device charging, electric vehicle (EV) charging, placard display, electronic advertising, street signage, pedestrian lighting, environmental sensing, wireless connectivity, camera imaging, etc.

Figure 4:
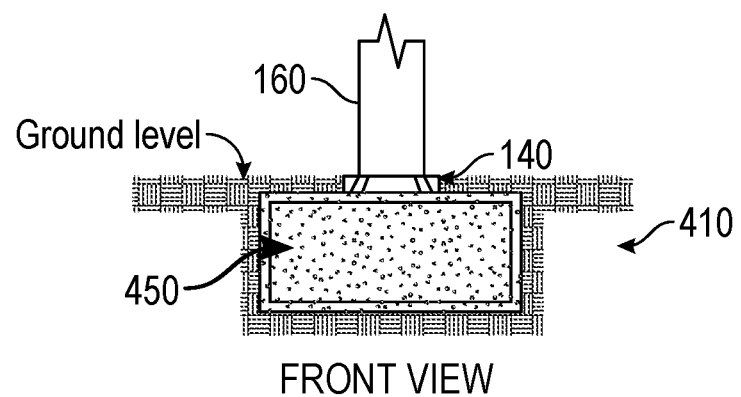
FIG. 4 illustrates two examples of a streetlight foundation for supporting a support structure of the multi-functional streetlight of FIG. 1.
Figure 4:
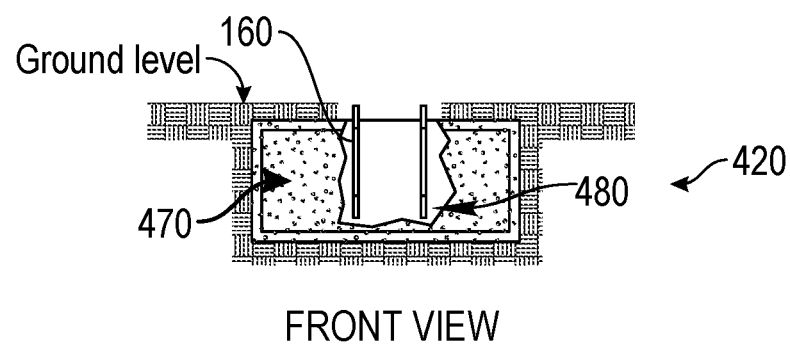

FIG. 4 illustrates two examples of a streetlight foundation 410, 420 for supporting a support structure 160 of the multi-functional streetlight 100 of FIG. 1. In a first example of using the streetlight foundation 410, a base flange 140 is coupled to the support structure 160 of the multi-functional streetlight 100. In one example, the base flange 140 may include drill holes (not shown) for securing the support structure 160 to the ground. In one example, the streetlight foundation 410 may include concrete 450 for anchoring the multi-functional streetlight 100 to the ground.

In a second example of using the streetlight foundation 420, part of the support structure 160 is subterranean. In this second example, the streetlight foundation 420 includes concrete 470 and a cavity 480 in the concrete 470, wherein a portion of the support structure 160 is inserted into the cavity 480 for anchoring the multi-functional streetlight 100 to the ground. In one example, a base flange 140 may be included for securing the support structure 160.

In one example, the support structure 160 includes the lower segment 130, intermediate segment 120, and arm segment 110. In one example, the lower segment 130 of the support structure is attached to the streetlight foundation.

Figure 5:
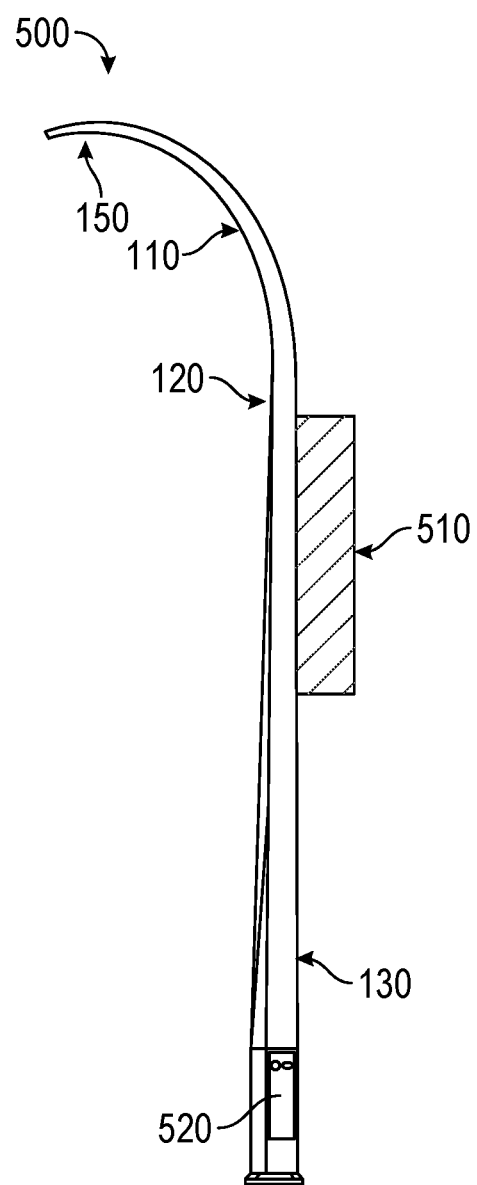
FIG. 5 illustrates an example multi-functional streetlight with one or more attachments.

FIG. 5 illustrates an example multi-functional streetlight 500 with one or more attachments. One skilled in the art would understand that the various features described in the present disclosure may apply equally to the multi-functional streetlight 500 or to the multi-functional streetlight 100 of FIG. 1. In one example, the multi-functional streetlight 500 shown in FIG. 5 is the multi-functional streetlight 100 shown in FIG. 1 with added features.

In one example, a digital banner 510 may be attached to the multi-functional streetlight 500 at the intermediate segment 120. The digital banner 510 may be used, for example, for public announcements, advertising, information, etc. In one example, a second banner (not shown) may be attached to the multi-functional streetlight 500 at the lower segment 130. The second banner may be another digital banner or it may be a non-digital banner (e.g., a cloth or vinyl banner, etc.). In one example, only the lower segment 130 has a banner (i.e., a digital banner or a non-digital banner) attached.

In one example, an electrical vehicle (EV) charger 520 may be attached to the multi-functional streetlight 500 at the lower segment 130. The EV charger 520 may be used, for example, for EV battery charging of an electric vehicle parked next to or near the multi-functional streetlight 500. In one example, the lower segment 130 may include at least one side with a trapezoidal shape. In one example, one or more of the lower segment 130 or intermediate segment 120 may include, lighting, structure(s) to hold pole assemblies or displays, and/or one or more sides of its hexagonal shape to be programmable to display information.

Figure 6:
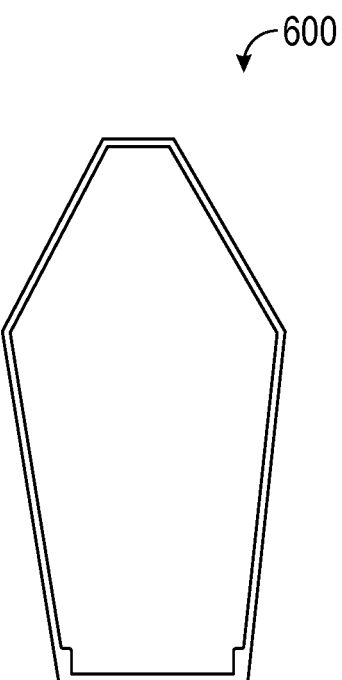
FIG. 6 illustrates an example cross-section of a support structure of the multi-functional streetlight of FIG. 1.

FIG. 6 illustrates an example cross-section 600 of a support structure 160 of the multi-functional streetlight 100 of FIG. 1. As shown in the example cross-section 600, it is a hexagonal shape. In one example, the cross-sections of a significant portion or the entirety of the support structure 160 of the multi-functional streetlight 100 are hexagonal in shape.

Figure 7:
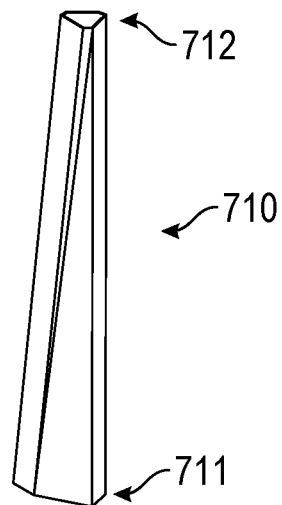
FIG. 7 illustrates a first example of a bottom portion of the lower segment of the multi-functional streetlight of FIG. 1.
Figure 7:
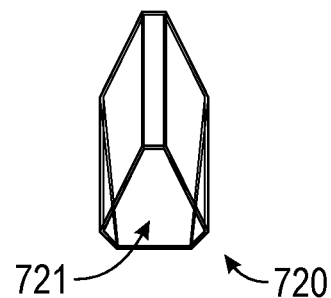
Figure 7:
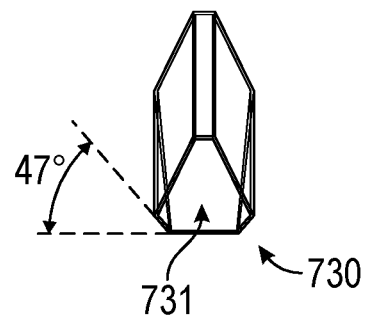

In one example, the lower section 130 includes a bottom portion, a middle portion and a top portion. FIG. 7 illustrates a first example 700 of a bottom portion 710 of the lower segment 130 of the multi-functional streetlight 100 of FIG. 1. In one example, all cross-sections of the lower segment 130 have a hexagonal shape. In one example, the bottom portion 710 of the lower segment 130 may include at least one side with a hexagonal shape 721. A hexagonal shape 731 is also shown on the cutout 730. In FIG. 7, the cutouts 720 and 730 indicate cutout pieces of the bottom portion 710. Cutout 720 indicates a piece of the bottom portion 710 near the area 711 of the bottom portion 710. Cutout 730 indicates a piece of the bottom portion 710 near the area 712 of the bottom portion 710. Any listed dimensions are examples only and one skilled in the art would understand that other dimensions are within the scope and spirit of the present disclosure. Any example dimensions shown on the cutouts are to illustrate the relative dimensions of the sides of the cutouts.

Figure 8:
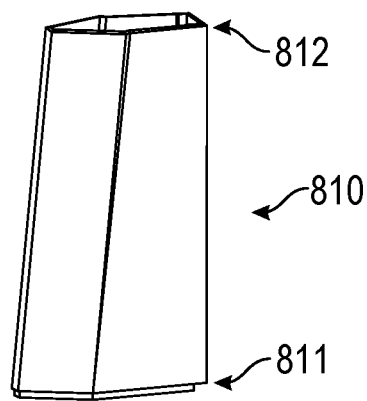
FIG. 8 illustrates a second example of a bottom portion of the lower segment of the multi-functional streetlight of FIG. 1.
Figure 8:
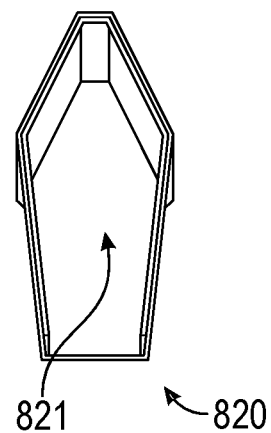
Figure 8:
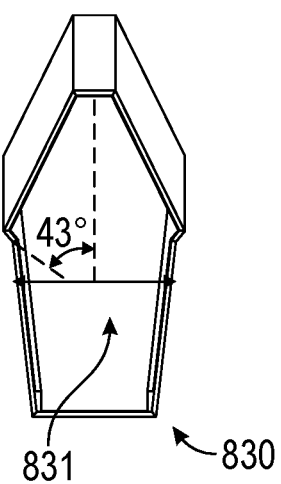

FIG. 8 illustrates a second example 800 of a bottom portion 810 of the lower segment 130 of the multi-functional streetlight 100 of FIG. 1. In one example, all cross-sections of the lower segment 130 have a hexagonal shape. In one example, the bottom portion 810 of the lower segment 130 may include at least one side with a hexagonal shape 821. A hexagonal shape 831 is also shown on the cutout 830. In FIG. 8, the cutouts 820 and 830 indicate cutout pieces of the bottom portion 810. Cutout 820 indicates a piece of the bottom portion 810 near the area 811 of the bottom portion 810. Cutout 830 indicates a piece of the bottom portion 810 near the area 812 of the bottom portion 810. Any listed dimensions are examples only and one skilled in the art would understand that other dimensions are within the scope and spirit of the present disclosure. Any example dimensions shown on the cutouts are to illustrate the relative dimensions of the sides of the cutouts.

Figure 9:
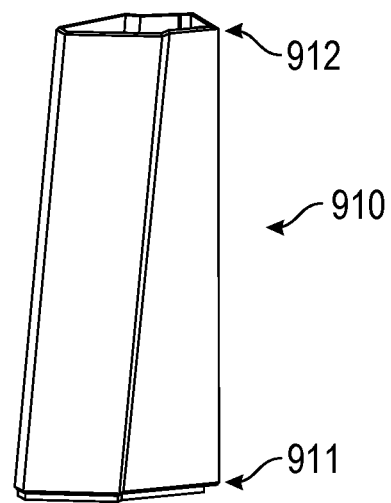
FIG. 9 illustrates an example of a middle portion of the lower segment of the multi-functional streetlight of FIG. 1.
Figure 9:
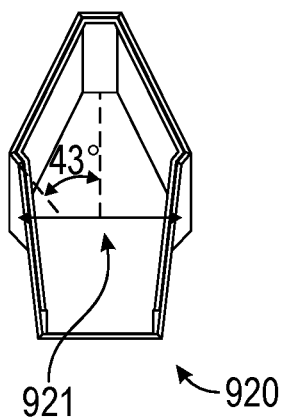
Figure 9:
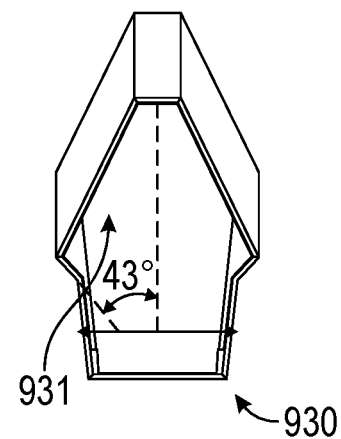

FIG. 9 illustrates an example 900 of a middle portion 910 of the lower segment 130 of the multi-functional streetlight 100 of FIG. 1. In one example, all cross-sections of the lower segment 130 have a hexagonal shape. In one example, the middle portion 910 of the lower segment 130 may include at least one side with a hexagonal shape 921. A hexagonal shape 931 is also shown on the cutout 930. In FIG. 9, the cutouts 920 and 930 indicate cutout pieces of the middle portion 910. Cutout 920 indicates a piece of the middle portion 910 near the area 911 of the middle portion 910. Cutout 930 indicates a piece of the middle portion 910 near the area 912 of the middle portion 910. Any listed dimensions are examples only and one skilled in the art would understand that other dimensions are within the scope and spirit of the present disclosure. Any example dimensions shown on the cutouts are to illustrate the relative dimensions of the sides of the cutouts.

Figure 10:
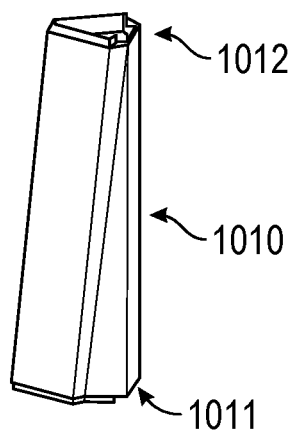
FIG. 10 illustrates an example of a top portion of the lower segment of the multi-functional streetlight of FIG. 1.
Figure 10:
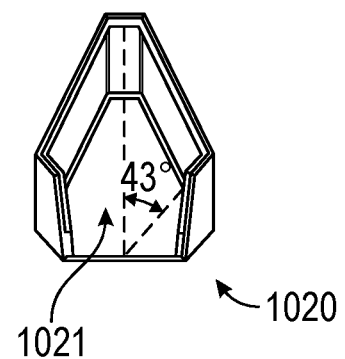
Figure 10:
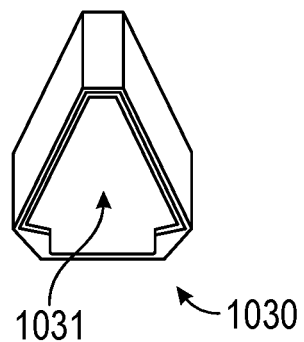

FIG. 10 illustrates an example 1000 of a top portion 1010 of the lower segment 130 of the multi-functional streetlight 100 of FIG. 1. In one example, all cross-sections of the lower segment 130 have a hexagonal shape. In one example, the top portion 1010 of the lower segment 130 may include at least one side with a hexagonal shape 1021. A hexagonal shape 1031 is also shown on the cutout 1030. In FIG. 10, the cutouts 1020 and 1030 indicate cutout pieces of the top portion 1010. Cutout 1020 indicates a piece of the top portion 1010 near the area 1011 of the top portion 1010. Cutout 1030 indicates a piece of the top portion 1010 near the area 1012 of the top portion 1010. Any listed dimensions are examples only and one skilled in the art would understand that other dimensions are within the scope and spirit of the present disclosure. Any example dimensions shown on the cutouts are to illustrate the relative dimensions of the sides of the cutouts.

Figure 11:
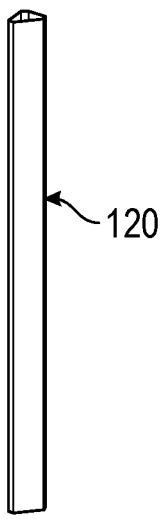
FIG. 11 illustrates an example of an intermediate segment of the multi-functional streetlight of FIG. 1.
Figure 11:
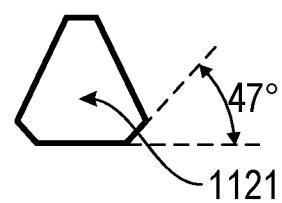
Figure 11:
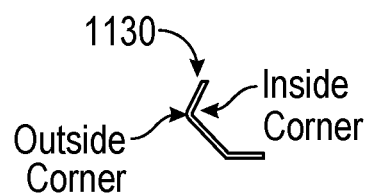

FIG. 11 illustrates an example 1100 of an intermediate segment 120 of the multi-functional streetlight 100 of FIG. 1. In one example, all cross-sections of the intermediate segment 120 have a hexagonal shape 1121. FIG. 11 shows an example view 1130 of the inside corners and outside corners of the hexagonal shape 1121. Any listed dimensions are examples only and one skilled in the art would understand that other dimensions are within the scope and spirit of the present disclosure. Any example dimensions shown on the cutouts are to illustrate the relative dimensions of the sides of the cutouts.

Figure 12:
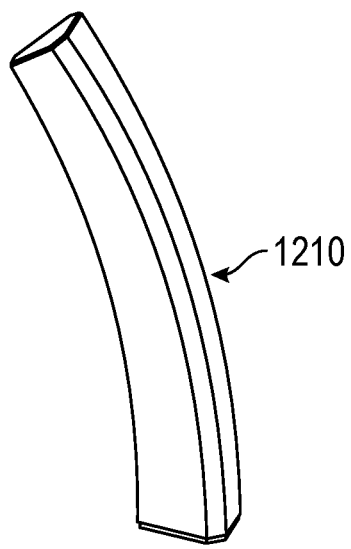
FIG. 12 illustrates an example of a bottom portion of an arm segment of the multi-functional streetlight of FIG. 1.
Figure 12:
Figure 12:
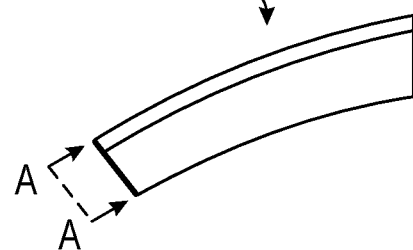

FIG. 12 illustrates an example 1200 of a bottom portion 1210 of an arm segment 110 of the multi-functional streetlight 100 of FIG. 1. In one example, all cross-sections of the arm segment 110 have a hexagonal shape 1220. The hexagonal shape 1220 represents a planar cutout of the arm segment 110 as designated by A-A in the view 1230.

Figure 13:
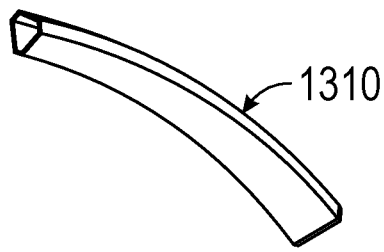
FIG. 13 illustrates an example of a middle portion of an arm segment of the multi-functional streetlight of FIG. 1.
Figure 13:
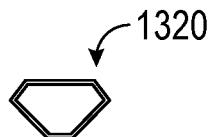
Figure 13:
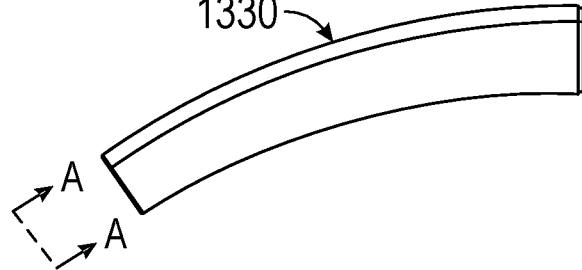

FIG. 13 illustrates an example 1300 of a middle portion 1310 of an arm segment 110 of the multi-functional streetlight 100 of FIG. 1. In one example, all cross-sections of the arm segment 110 have a hexagonal shape 1320. The hexagonal shape 1320 represents a planar cutout of the arm segment 110 as designated by A-A in the view 1330.

Figure 14:
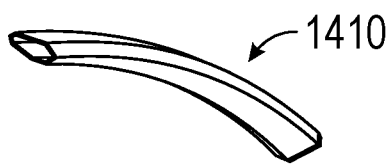
FIG. 14 illustrates an example of a top portion of an arm segment of the multi-functional streetlight of FIG. 1.
Figure 14:
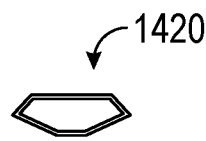
Figure 14:
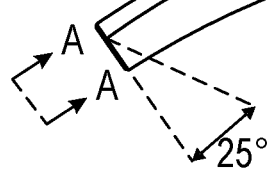

FIG. 14 illustrates an example 1400 of a top portion 1410 of an arm segment 110 of the multi-functional streetlight 100 of FIG. 1. In one example, all cross-sections of the arm segment 110 have a hexagonal shape 1420. The hexagonal shape 1420 represents a planar cutout of the arm segment 110 as designated by A-A in the view 1430. Any listed dimensions are examples only and one skilled in the art would understand that other dimensions are within the scope and spirit of the present disclosure. Any example dimensions shown on the cutouts are to illustrate the relative dimensions of the sides of the cutouts.

Figure 15:
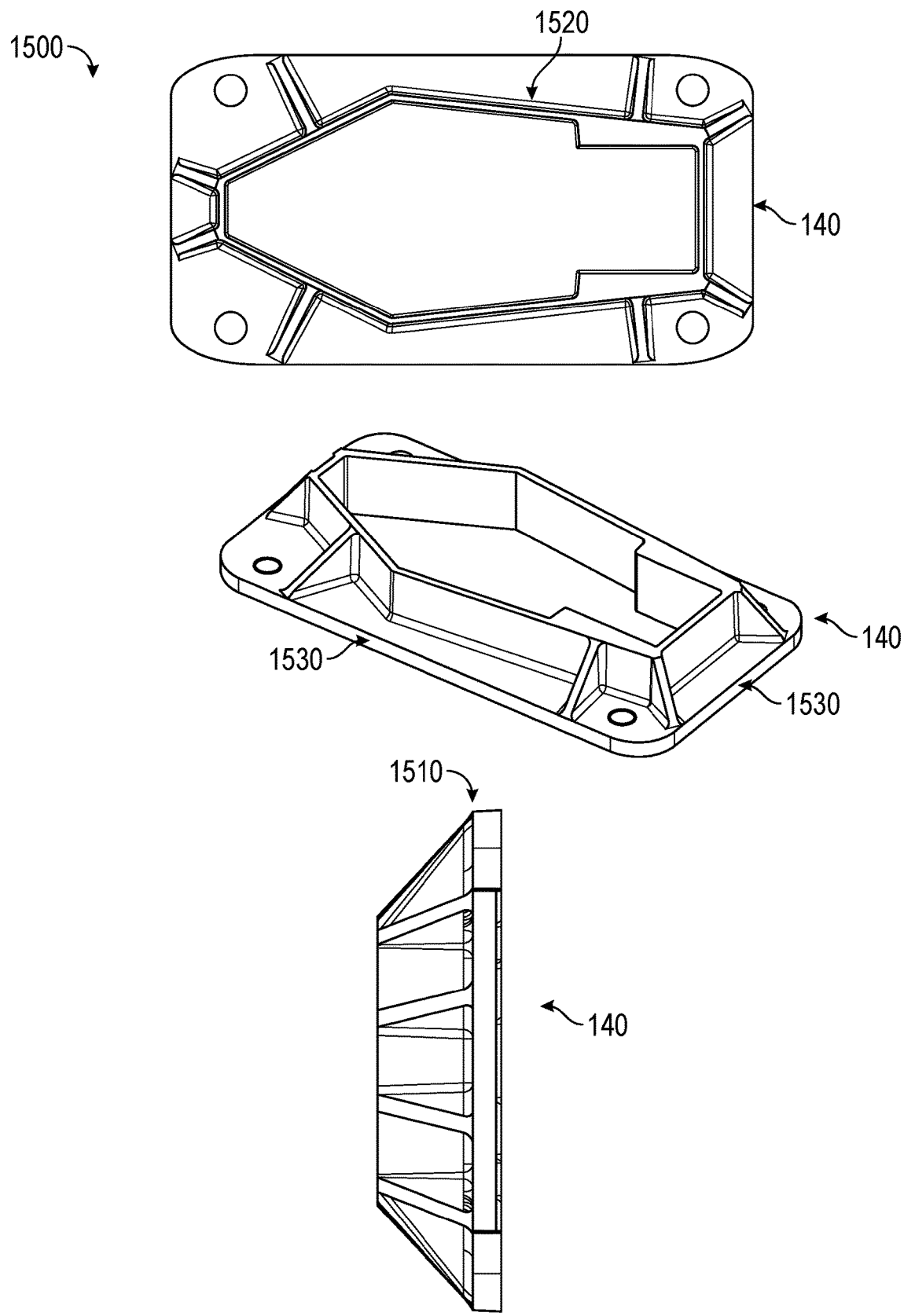
FIG. 15 illustrates an example of a base flange of the multi-functional streetlight of FIG. 1.

FIG. 15 illustrates an example 1500 of a base flange 140 of the multi-functional streetlight 100 of FIG. 1. In one example, the base flange 140 has a hexagonal shape 1520. A side view 1510 of the base flange 140 is shown in FIG. 15. The base 1530 of the base flange 140 is shown in FIG. 15.

Table 1 summarizes key features of one example design of the support structure 160 (i.e., pole) for the multi-functional streetlight 100. For example, the base flange 140, the lower segment 130 and the arm segment 110 use cast aluminum as the metal type. For example, the intermediate segment 120 uses extruded aluminum as the metal type. In another example, the multi-functional streetlight 100 may use a different mix of metal types and may have a different set of lengths. The dimensions listed in Table 1 are in inches, unless otherwise specified. And, any dimensions listed are example dimensions. The listed dimensions are examples only and one skilled in the art would understand that other dimensions are within the scope and spirit of the present disclosure.

TABLE 1

| segment | section | metal type | Length, in. |
| --- | --- | --- | --- |
| Base flange | | Al cast | |
| Lower | Pole base | Al cast | 46.00 |
| | Bottom transition | Al cast | 37.25 |
| | Middle transition | Al cast | 37.00 |
| | Top transition | Al cast | 37.25 |
| Intermediate | | Al extrusion | 126.75 |
| Arm | Bottom | Al cast | 44.07 |
| | Middle | Al cast | 28.92 |
| | Top | Al cast | 7.01 |

In one example, the multi-functional streetlight 100 may provide a directional illumination characteristic in a predominantly downward and forward direction (e.g., street side). For example, a total perceived power over a specified solid angle may be quantified as luminous flux in units of lumens. For example, the average luminous intensity, expressed in units of candelas (lumens per steradian), quantifies the directivity of the illumination from the multi-functional streetlight over a nadir angle range of the specified solid angle. For example, the nadir angle is measured relative to a negative vertical direction from the perspective of the light source of the streetlight.

Table 2 illustrates example directional illumination characteristics using a multi-functional streetlight light source with a light array of 16 LEDs. In this example, the total luminous flux is 31499 lumens, the luminous efficacy is 133 lm/W and the total luminance power is 236 W. For example, a street side direction refers to a front direction of the streetlight and a house side direction refers to a back direction of the streetlight. In one example, the streetlight light source is contained by a luminaire. The dimensions listed in Table 2 are example dimensions. The listed dimensions are examples only and one skilled in the art would understand that other dimensions are within the scope and spirit of the present disclosure.

TABLE 2

| direction | nadir angle, deg | luminous flux, lumens | % of total | solid angle, steradian | avg luminous intensity, cd |
| --- | --- | --- | --- | --- | --- |
| Downward, street side | | | | | |
| Front low | 0-30 | 3450.2 | 11.0 | 0.421 | 8197 |
| Front medium | 30-60 | 10454.5 | 33.2 | 1.150 | 9092 |
| Front high | 60-80 | 8535.0 | 27.1 | 1.025 | 8325 |
| Front very high | 80-90 | 268.4 | 0.9 | 0.546 | 492 |
| Downward, house side | | | | | |
| Back low | 0-30 | 2680.6 | 8.5 | 0.421 | 6369 |
| Back medium | 30-60 | 3787.1 | 12.0 | 1.150 | 3293 |
| Back high | 60-80 | 2139.5 | 6.8 | 1.025 | 2087 |
| Back very high | 80-90 | 183.6 | 0.6 | 0.546 | 337 |
| Downward, street side | | 22708.1 | 72.1 | 3.142 | 7228 |
| Downward, house side | | 8790.7 | 27.9 | 3.142 | 2798 |
| Upward | 0-90 | 0.0 | 0.0 | 6.284 | 0 |
| Total | | 31498.8 | 100.0 | 12.566 | 2507 |

In one example, given the total solid angle over a sphere surrounding the multi-functional streetlight is 12.566 (4 pi) steradians, the downward street side direction is one quarter of the sphere (i.e., a front lower quarter), the downward house side direction is one quarter of the sphere (i.e., a back lower quarter) and the upward direction is one half of the sphere (i.e., an upper half). In one example, Table 2 shows an example multi-functional streetlight design where more than 70% of the luminous flux (in lumens) is directed downward in the street side direction (into the front lower quarter of the sphere) and less than 30% of the luminous flux is directed downward in the house side direction (into the back lower quarter of the sphere). Also, no luminous flux is directed upwards, for example, into the upper half of the sphere. That is, the multi-functional streetlight design is highly efficient (i.e., directional) in directing illumination into a desired direction (e.g., street side).

Figure 16:
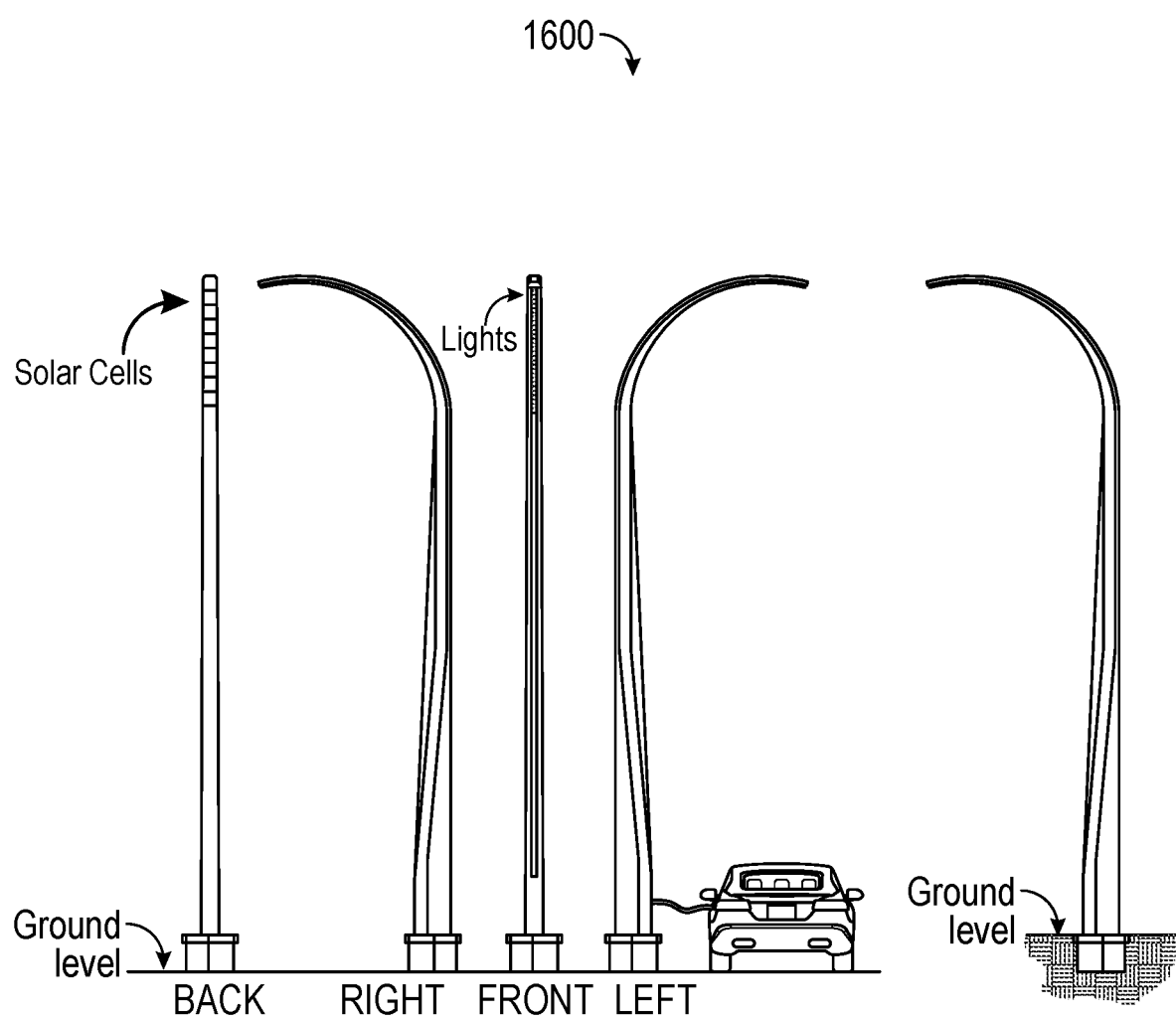
FIG. 16 illustrates an example of the multi-functional streetlight of FIG. 1 in four different views: back view, right side view, face view and left side view.

FIG. 16 illustrates an example 1600 of the multi-functional streetlight 100 of FIG. 1 in four different views: back view, right side view, front view and left side view. An additional right view shows the base flange below the ground level and an example vertical height of 30 feet. As illustrated on the back view shown in FIG. 16, a plurality of solar cells (e.g., arranged as one or more solar cells) is included on the top side of the arm segment 110. As illustrated on the face view shown in FIG. 16, one or more light sources are included on the under side of the arm segment 110 for illuminating the ground. In one example, a camera is included at the tip of the arm segment 110. In one example, sensors of dimming, Wifi source, temperature and/or air quality sensor(s) is included on the support structure 160 of the multi-function streetlight 110. In one example, environmental lighting may be included on the support structure 160 of the multi-function streetlight 110. In one example, a placard (e.g., for advertisement or information presentation, etc.) is included on the support structure 160 of the multi-function streetlight 110. In one example, an electric vehicle (EV) charging is included on the support structure 160 of the multi-function streetlight 110 to charge a car. In one example, the support structure 160 is 30 feet.

Figure 17:
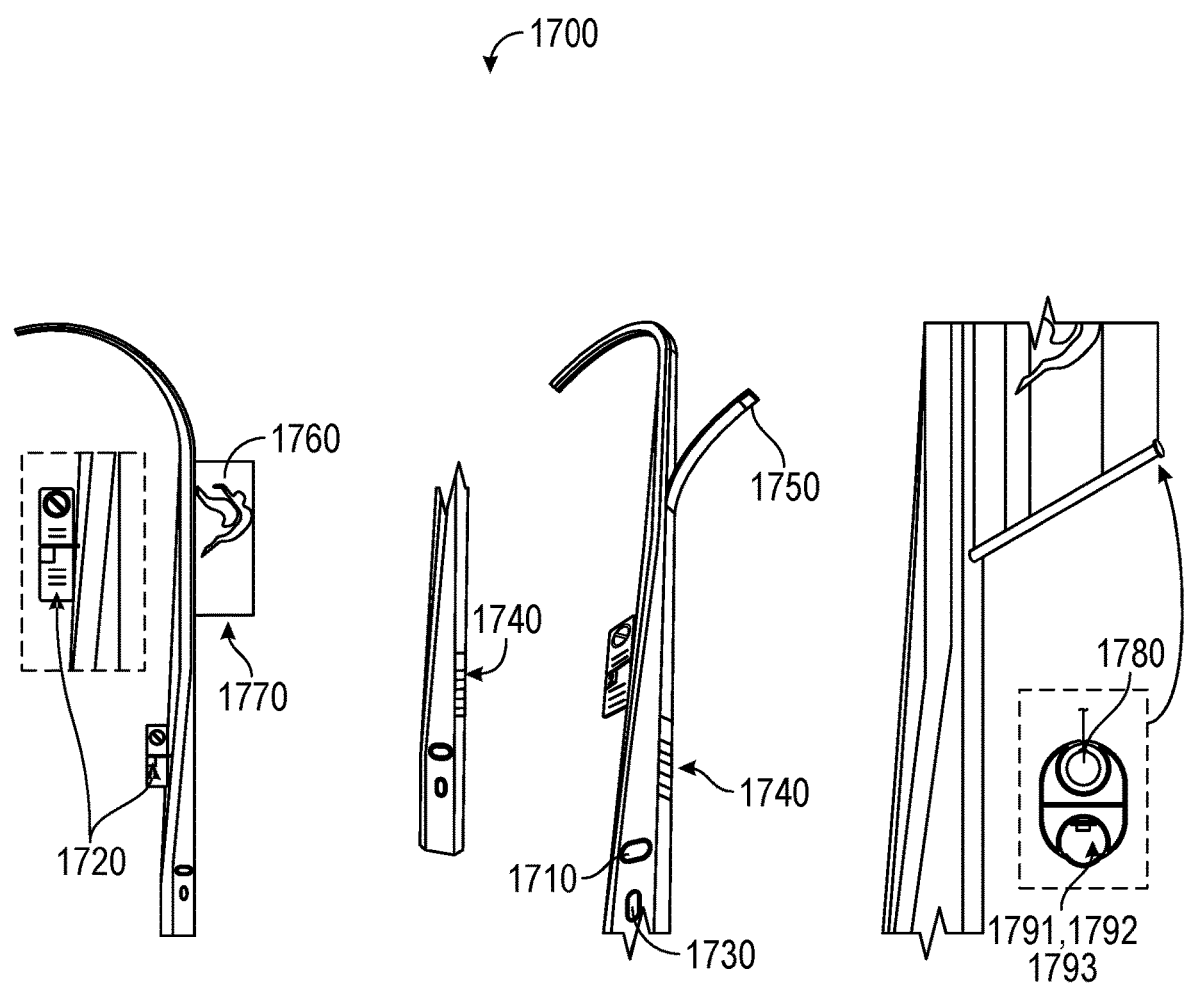
FIG. 17 illustrates an example view of various features that may be included with the multi-functional streetlight of FIG. 1.

FIG. 17 illustrates an example view 1700 of various features that may be included with the multi-functional streetlight 100 of FIG. 1. In one example, the multi-functional streetlight 100 includes a digital banner 1760 and one or more non-digital banners 1720. In one example, the digital banner 1760 includes a banner rod 1770. An extruded metal profile of the banner rod 1770 is shown in FIG. 17. In the example, the extruded metal profile shows the banner rod 1770 to include a structural rod 1780 and one or more of the following: a light source 1791 (i.e., auxiliary light source), a camera 1792 and one or more sensors 1793.

In one example, the multi-functional streetlight 100 includes an EV charging station 1730 to charge a car parked near the multi-functional streetlight 100. In one example, a display 1710 is coupled to the EV charging station to display information relating to the EV charging. In one example, the multi-functional streetlight 100 includes a digital display 1740 on one side of the support structure 160. In the example of FIG. 17, the digital display 1740 is located on the lower segment 130. The digital display 1740 may display advertisements, traffic information, news, etc.

In one example, a pedestrian arm 1750 is attached to the intermediate segment 120. The pedestrian arm 1750 may provide shade for a pedestrian (not shown) standing near the multi-functional streetlight 100 as well as additional lighting for the pedestrian. In one example, the pedestrian arm 1750 includes a plurality of light sources (e.g., LEDs) to provide illumination. In one example, a plurality of solar cells is coupled to the pedestrian arm to provide energy to the plurality of light sources on the pedestrian arm 1750. In one example, the plurality of light sources is grouped into a plurality of modules, such that one or more modules of light sources may be replaced without affecting the other remaining modules. That is, the plurality of light sources is grouped into a plurality of modules, and each of the plurality of modules is configured for replacement without affecting the illumination output of the remaining plurality of modules. In one example, the pedestrian arm 1750 may include one or more of the following: light source(s), camera(s) and/or sensor(s).

In one aspect, various features of the multi-functional streetlight 100 of FIG. 1 may be executed by one or more processors (e.g., a programmable processor) which may include hardware, software, firmware, etc. In one example, the one or more processors may include a memory. The one or more processors, for example, may be used to execute software or firmware needed to perform the features of the multi-functional streetlight 100 of FIG. 1. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may reside in a processing system, external to the processing system, or distributed across multiple entities including the processing system. The computer-readable medium may be embodied in a computer program product. By way of example, a computer program product may include a computer-readable medium in packaging materials. The computer-readable medium may include software or firmware for one or more features of the multi-functional streetlight 100 of FIG. 1. Those skilled in the art will recognize how best to implement the described functionality presented throughout this disclosure depending on the particular application and the overall design constraints imposed on the overall system.

Any circuitry included in the processor(s) is merely provided as an example, and other means for carrying out the described functions may be included within various aspects of the present disclosure, including but not limited to the instructions stored in the computer-readable medium, or any other suitable apparatus or means described herein, and utilizing, for example, the processes and/or algorithms described herein in relation to the example flow diagram.

Within the present disclosure, the word "example" or "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A multi-functional streetlight, comprising:
   a hexagonal shaped support structure, wherein the hexagonal shaped support structure includes an arm segment, a lower segment, and an intermediate segment, wherein the lower segment is coupled to the intermediate segment and the intermediate segment is coupled to the arm segment, wherein the arm segment includes a luminaire on an under side of the arm segment and the arm segment is curved with respect to the intermediate segment, and wherein a planar cut out of each of the lower segment, the intermediate segment, and the arm segment is hexagonal in shape; and
   a base flange configured to couple the hexagonal shaped support structure to the ground.

2. The multi-functional streetlight of claim 1 further comprising a digital banner configured to present one or more of the following: advertisement, traffic information, street signage information, consumer information, news information, and weather information, wherein the digital banner is attached to the hexagonal shaped support structure.

3. The multi-functional streetlight of claim 2, wherein the digital banner is attached to the intermediate segment.

4. The multi-functional streetlight of claim 3, wherein the digital banner includes a banner rod, and wherein the banner rod comprises a structural rod and one or more of the following: an auxiliary light source, a camera and one or more sensors configured for environmental sensing.

5. The multi-functional streetlight of claim 4, wherein the auxiliary light source comprises one or more light emitting diodes (LEDs).

6. The multi-functional streetlight of claim 1 further comprising a non-digital banner configured to present one or more of the following: advertisement, traffic information, street signage information, consumer information, news information, and weather information, wherein the non-digital banner is attached to the hexagonal shaped support structure.

7. The multi-functional streetlight of claim 6, wherein the non-digital banner is attached to the lower segment.

8. The multi-functional streetlight of claim 1 further comprising a pedestrian arm, wherein the pedestrian arm is configured to provide shading from the sun to a pedestrian near the multi-function streetlight.

9. The multi-functional streetlight of claim 8, wherein the pedestrian arm includes a plurality of light sources.

10. The multi-functional streetlight of claim 1, wherein the luminaire comprises a plurality of illumination modules, and wherein each of the plurality of illumination modules is configured for replacement without affecting illumination output of a remaining of the plurality of illumination modules.

11. The multi-functional streetlight of claim 1, further comprising an electric vehicle (EV) charging station, wherein the EV charging station is located on the lower segment.

12. The multi-functional streetlight of claim 11, further comprising a portable device charging station, wherein the portable device charging station is located on the lower segment.

13. The multi-functional streetlight of claim 12, further comprising at least one solar cell coupled to the multi-functional streetlight, wherein the at least one solar cell is configured for electric energy generation.

14. The multi-functional streetlight of claim 13, wherein the at least one solar cell is configured to power one or both of the EV charging station and the portable device charging station.

15. The multi-functional streetlight of claim 1, further comprising one or more of a wireless communications node, an emergency call station, a digital interactive street portal, an alert notification.

16. The multi-functional streetlight of claim 1, wherein the lower segment comprises a digital display configured to present one or more of the following: advertisement, traffic information, street signage information, consumer information, news information, and weather information.

17. The multi-functional streetlight of claim 16, wherein the lower segment includes a trapezoidal shaped panel configured to house the digital display.

18. The multi-functional streetlight of claim 1, further comprising a plurality of solar cells on a top side of the arm segment, wherein the plurality of solar cells is configured to deliver electric energy to the luminaire.

* * * * *